US012798277B1

(12) United States Patent
Benishai

(10) Patent No.: US 12,798,277 B1
(45) Date of Patent: Nov. 17, 2026

(54) DIGITAL KIOSK FOR PHOTOS THAT ATTACH BY MAGNET AND BY ADHESIVE

(71) Applicant: Alon Benishai, Oakhurst, NJ (US)

(72) Inventor: Alon Benishai, Oakhurst, NJ (US)

( * ) Notice: Subject to any disclaimer, the term of this patent is extended or adjusted under 35 U.S.C. 154(b) by 0 days.

(21) Appl. No.: 19/447,635

(22) Filed: Jan. 13, 2026

(51) Int. Cl.
*B41M 5/50* (2006.01)
*B32B 7/025* (2019.01)
(Continued)

(52) U.S. Cl.
CPC ............. *B41M 5/508* (2013.01); *B32B 7/025* (2019.01); *B32B 7/06* (2013.01); *B32B 7/12* (2013.01); *B32B 25/02* (2013.01); *B32B 27/20* (2013.01); *B32B 27/304* (2013.01); *B41J 3/407* (2013.01); *B41J 3/46* (2013.01); *B41J 11/00214* (2021.01); *B41J 13/0063* (2013.01); *B41J 13/103* (2013.01); *B41M 5/504* (2013.01); *B41M 5/52* (2013.01); *G03B 27/52* (2013.01); *G06F 3/1208* (2013.01); *G06F 3/1272* (2013.01); *G06F 3/1288* (2013.01); *B32B 2255/10* (2013.01); *B32B 2255/26* (2013.01); *B32B 2264/10* (2013.01); *B32B 2307/208* (2013.01);
(Continued)

(58) Field of Classification Search
None
See application file for complete search history.

(56) References Cited

U.S. PATENT DOCUMENTS 11,356,569 B2 6/2022 Kline
2001/0004486 A1* 6/2001 Pynenburg ................ G09F 7/04
428/195.1
2021/0170735 A1* 6/2021 Nam ................... B32B 38/0004

FOREIGN PATENT DOCUMENTS

EP 4147119 A1 3/2023
IL 298955 B1 10/2023
(Continued)

OTHER PUBLICATIONS

Screen Captures from YouTube Video entitled "Kiosk Demo," https://www.youtube.com/shorts/As4tBvbzCYo?feature=share; Uploaded May 22, 2026; By Senthil Raman (@senthilraman8076), Downloaded from Youtube Jun. 13, 2026.
(Continued)

*Primary Examiner* — Mark R Milia
(74) *Attorney, Agent, or Firm* — Shlomo Horowitz; Shlomo Horowitz Patents and Intellectual Property Ltd.

(57) ABSTRACT

A digital kiosk has a digital screen displaying a machine-readable code. The user's mobile device links to it to open a web site that receives a digital photo uploaded by the user. A UV printer or sublimation printer is fed by an automated feeder individual flexible blank pre-cut magnetic sheets from a stack of them. Each sheet includes a UV-receptive coating for UV-curable ink and, after printing, a UV-curable ink image layer formed on the coating, or else a sublimation-compatible polymer coating configured to receive and embed sublimation dye during heat transfer. Each sheet also includes a flexible magnetic layer comprising magnetic particles dispersed in a flexible polymer binder, the magnetic particles comprising ferrite particles, neodymium particles, or combinations thereof, a pressure sensitive adhesive layer and a peelable cover layer configured to be removed to permit adhesion of the photo to nonmetal substrates. A dispenser outputs the physical photo.

22 Claims, 7 Drawing Sheets

(51) Int. Cl.

| | |
|---|---|
| ***B32B 7/06*** | (2019.01) |
| ***B32B 7/12*** | (2006.01) |
| ***B32B 25/02*** | (2006.01) |
| ***B32B 27/20*** | (2006.01) |
| ***B32B 27/30*** | (2006.01) |
| ***B41J 3/407*** | (2006.01) |
| ***B41J 3/46*** | (2006.01) |
| ***B41J 11/00*** | (2006.01) |
| ***B41J 13/00*** | (2006.01) |
| ***B41J 13/10*** | (2006.01) |
| ***B41M 5/52*** | (2006.01) |
| ***G03B 27/52*** | (2006.01) |
| ***G06F 3/12*** | (2006.01) |
| *G06K 19/06* | (2006.01) |

(52) U.S. Cl.
CPC . *B32B 2307/584* (2013.01); *B32B 2307/7376* (2023.05); *B41M 2205/36* (2013.01); *G06K 19/06037* (2013.01)

(56) References Cited

FOREIGN PATENT DOCUMENTS

| | | | |
|---|---|---|---|
| KR | 102593715 | B1 | 10/2023 |
| KR | 102836314 | B1 | 7/2025 |
| WO | WO2020005117 | A1 | 1/2020 |

OTHER PUBLICATIONS

Foto Booth Software, Website [Online]. Foto ATM, 2018 [retrieved on Jun. 13, 2026]. Retrieved from the Internet: <URL: https://fotoatm.com/software/>.

Payment Mirror Booth | All-in-One & Portable, YouTube Video [Online]. Phoprint Photo Booth, posted Sep. 5, 2025; Retrieved from YouTube: https://www.youtube.com/watch?v=RfFLaUhVvO0, Jun. 20, 2026.

A4/A3 Self-Service QR Payment Kiosk Document Vending Machine SDK Function Multi-OS 80mm Thermal Printer Capacitive Touch Metal Demo Video; Shenzhen Hunghui It Co., Ltd on Alilbaba Website as of Apr. 8, 2024, Retrieved https://www.alibaba.com/product-detail/A4-A3-Self-Service-QR-Payment_1601380787463.html, Jun. 20, 2026.

* cited by examiner

DIGITAL KIOSK FOR PHOTOS THAT ATTACH BY MAGNET AND BY ADHESIVE

FIELD OF THE INVENTION

The invention is in the field of photos with dual methods of attachment of the photo for use with different types of substrates, and in particular a digital kiosk configured to dispense such photos.

BACKGROUND OF THE INVENTION

Existing UV flatbed printers are large, expensive, and not designed for self-service or high-throughput consumer use. Regarding sublimation printers, existing sublimation methods require long dwell times and pre-coated blanks, unsuitable for fast tourist workflows.

SUMMARY OF THE EMBODIMENTS

One embodiment is a digital kiosk, comprising
- a high-speed printer compatible with UV-curable ink,
- an automated feeder on or inside the kiosk and configured to repeatedly deliver to the printer individual flexible blank pre-cut magnetic sheets from a stack of the blank pre-cut magnetic sheets,
- each of the blank pre-cut magnetic sheets in the stack comprising the following layers:
- a UV-receptive coating configured to receive UV-curable ink deposited by the printer;
- a flexible magnetic layer comprising magnetic particles dispersed in a flexible polymer binder, the magnetic particles comprising ferrite particles, neodymium particles, or combinations thereof,
- a pressure sensitive adhesive layer; and
- a peelable cover layer configured to be removed to permit adhesion of the physical photo to nonmetal substrates, wherein the printer is configured to deposit UV-curable ink onto the UV-receptive coating of each sheet to form a UV-curable ink image layer during printing and curing,
- a dispenser for dispensing the physical photo to the user, and
- a digital screen configured to display a machine-readable code that, when scanned by a user device, encodes information associated with a particular user and links to a web site configured to receive a digital photo uploaded by the particular user.

In some embodiments, the digital kiosk further comprises an application stored on the user's mobile device, the application configured to prompt the user to select (i) the digital photo from a photo gallery of the user's mobile device and (ii) a size and frame of a physical photo derived from the digital photo.

In some embodiments, the digital kiosk further comprises one or more processors configured to execute instructions that determine a pickup time at the kiosk for a physical photo printing job and associate the pickup time with a user identifier or an order identifier.

In some embodiments, the digital kiosk further comprises one or more processors configured to execute instructions to control a quality of the physical photo by controlling a camera configured to check print quality and automatically enhance the photo if necessary.

In some embodiments, the digital kiosk further comprises one or more processors configured to execute instructions to perform one or both of (i) match an order identification with a user based on the machine-readable code and (ii) sort physical photos into individual bins for customer pick-up.

In some embodiments, the UV-receptive coating comprises an acrylic-based material, a urethane-based material, or a combination thereof, and has a thickness of from about 1 micron to about 25 microns.

In some embodiments, the UV-receptive coating is from about 5 microns to about 6 microns thick.

In some embodiments, the flexible polymer binder is flexible PVC or rubber.

In some embodiments, the magnetic layer is disposed between the coating and the pressure sensitive adhesive layer.

Another embodiment is a digital kiosk, comprising
- a sublimation printer,
- an automated feeder on or inside the kiosk and configured to repeatedly deliver to the printer individual flexible blank pre-cut magnetic sheets from a stack of the blank pre-cut magnetic sheets,
- each of the blank pre-cut magnetic sheets in the stack comprising the following layers in the following order:
- (i) a sublimation-compatible polymer coating configured to receive and embed sublimation dye during a heat transfer process;
- (ii) a flexible magnetic layer underneath the coating, the flexible magnetic layer comprising magnetic particles dispersed in a flexible polymer binder, the magnetic particles comprising ferrite particles, neodymium particles, or combinations thereof;
- (iii) a pressure sensitive adhesive layer; and
- (iv) a peelable cover layer configured to be removed to permit adhesion of the physical photo to nonmetal substrates,
- a dispenser for dispensing the physical photo to the user, and
- a digital screen configured to display a machine-readable code that, when scanned by a user device, encodes information associated with a particular user and links to a web site configured to receive a digital photo uploaded by the particular user.

In some embodiments, the digital kiosk further comprises an application stored on the user's mobile device, the application configured to prompt the user to select (i) the digital photo from a photo gallery of the user's mobile device and (ii) a size and frame of a physical photo derived from the digital photo.

In some embodiments, the digital kiosk further comprises one or more processors configured to execute instructions that determine a pickup time at the kiosk for a physical photo printing job and associate the pickup time with a user identifier or an order identifier.

In some embodiments, the polymer coating is made from polymer resin and has a thickness of about 1 to about 25 microns.

In some embodiments, the polymer coating has a thickness of about 5 to about 6 microns.

In some embodiments, the flexible polymer binder is flexible PVC or rubber.

In some embodiments, the digital kiosk further comprises one or more processors configured to execute instructions to control quality of the physical photo by controlling a camera configured to check print quality and automatically enhance the photo if necessary.

In some embodiments, the digital kiosk further comprises one or more processors configured to execute instructions to perform one or both of (i) match an order identification based on the machine-readable code and (ii) sort physical photos into individual bins for customer pick-up.

In some embodiments, the magnetic layer is disposed between the polymer coating and the pressure sensitive adhesive layer.

A further embodiment is a flexible, pre-cut sheet comprising the following layers:

(i) a UV-receptive coating configured to receive UV-curable ink deposited by the printer;

(ii) a UV-curable ink image layer formed on the coating during printing and curing;

(iii) a flexible magnetic layer comprising magnetic particles dispersed in a flexible polymer binder, the magnetic particles comprising ferrite particles, neodymium particles, or combinations thereof;

(iv) a pressure sensitive adhesive layer; and (v) a peelable cover layer configured to be removed to permit adhesion of the sheet to nonmetal substrates.

In some embodiments, in each sheet the magnetic layer is disposed between the coating and the pressure sensitive adhesive layer.

In some embodiments, the coating comprises an acrylic-based material or a urethane-based material.

In some embodiments, the coating is about 1 to about 25 microns thick.

In some embodiments, the coating is about 5 to about 6 microns thick.

In some embodiments, the coating is a scratch resistant coating layer configured to resist abrasion during automated feeding, printing, and user handling.

In some embodiments, the flexible polymer binder of the flexible magnetic layer comprises flexible PVC or rubber.

A still further embodiment is a flexible, pre-cut sheet configured to be fed into a sublimation printer, the sheet comprising the following layers:

(i) a sublimation-compatible polymer coating configured to receive and embed sublimation dye during a heat transfer process;

(ii) a flexible magnetic layer underneath the coating, the flexible magnetic layer comprising magnetic particles dispersed in a flexible polymer binder, the magnetic particles comprising ferrite particles, neodymium particles, or combinations thereof, (iii) a pressure sensitive adhesive layer; and (iv) a peelable cover layer configured to be removed to permit adhesion of the sheet to nonmetal substrates.

In some embodiments, the polymer coating comprises polyester.

In some embodiments, the polymer coating is about 1 to about 25 microns thick.

In some embodiments, the polymer coating is about 5 to about 6 microns thick.

In some embodiments, the flexible polymer binder of the flexible magnetic layer comprises flexible PVC or rubber.

BRIEF DESCRIPTION OF THE DRAWINGS

Various embodiments are herein described, by way of example only, with reference to the accompanying drawings, wherein.

DETAILED DESCRIPTION OF THE EMBODIMENTS

Figure 1:
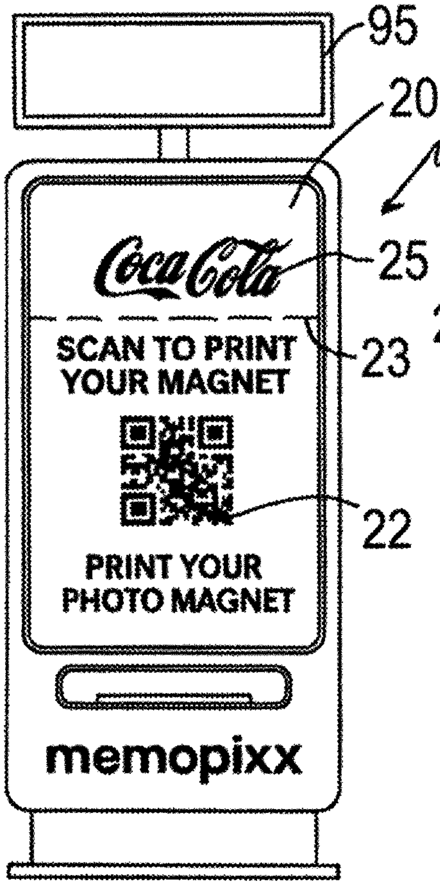
FIG. 1 is a front view of a digital kiosk, in accordance with one embodiment.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Applicant has found that current consumer kiosks (photo booths, dye-sub) cannot print directly onto magnetic media. There is no known compact, automated kiosk solution for rapidly producing consumer-grade photo magnets at tourist locations.

In some embodiments, a digital kiosk has a digital screen configured to display a machine-readable code, that when scanned by a user device, encodes information associated with a particular user, and links to a web site configured to receive a digital photo uploaded by the particular user. In one embodiment, a high speed printer, for example an ultra-high-speed printer compatible with UV-curable ink receives sheets from an automated feeder on or inside the kiosk and configured to repeatedly deliver to the printer individual flexible blank pre-cut magnetic sheets from a stack of the blank pre-cut magnetic sheets.

If the printer is an UV printer, then each of the blank pre-cut magnetic sheets in the stack comprises the following layers: (i) a UV-receptive coating configured to receive UV-curable ink deposited by the printer; (ii) a UV-curable ink image layer formed on the coating during printing and curing; (iii) a flexible magnetic layer comprising magnetic particles dispersed in a flexible polymer binder, the magnetic particles comprising ferrite particles, neodymium particles, or combinations thereof; (iv) a pressure sensitive adhesive layer; and (v) a peelable cover layer configured to be removed to permit adhesion of the sheet (when it is in the form of a physical photo) to nonmetal substrates.

If the printer is a sublimation printer, then each of the blank pre-cut magnetic sheets in the stack of sheets comprises the following layers (i) a sublimation-compatible polymer coating configured to receive and embed sublimation dye during a heat transfer process; (ii) a flexible magnetic layer underneath the coating, the flexible magnetic layer comprising magnetic particles dispersed in a flexible polymer binder, the magnetic particles comprising ferrite particles, neodymium particles, or combinations thereof; (iii) a pressure sensitive adhesive layer; and (iv) a peelable cover layer configured to be removed to permit adhesion of the sheet (when the sheet is a finished product ready for use as a photo that can be easily attached) to nonmetal substrates.

A dispenser integrally formed with the kiosk dispenses the physical photo to the user. The physical photo can be easily placed on a metal surface such as the door of a refrigerator or easily adhered to a wood or plastic or glass or other nonmetal surface by peeling off the peelable cover layer. The physical photo is configured such that it attaches to a substrate by the force of the magnet, the peelable cover layer can nonetheless remain on (does not have to be peeled off) without interfering with the magnet.

The principles and operation of a Digital Kiosk for Photos that Attach by Magnet and by Adhesive may be better understood with reference to the drawings and the accompanying description.

As shown in FIG. 1, a digital kiosk 10 includes a digital screen 20 configured to display a machine-readable code 22, which may be a QR code 22 or a bar code 22. Alternatively, the machine-readable code is a NFC protocol code 22 and the screen 20 can communicate to the user's phone via a Near Field Communication (NFC) protocol. The machine-readable code, when scanned by a user device, encodes information associated with a particular user, and links to a web site configured to receive a digital photo uploaded by the particular user.

In some embodiments, as an option depicted by the dashed line 23 in FIG. 1, the digital screen may comprise two separate digital display screens 20 separated by this line 23. In some implementations of this one of the two digital display screens can be for advertisements 25 and one for the machine readable code 22. In general, if there are two display screens 20, a first display 20 may be used for presenting a QR code 22 or other machine-readable code 22, user instructions, or status information, and a second display 20 may be used for branding, advertising, or auxiliary information.

Figure 4A:
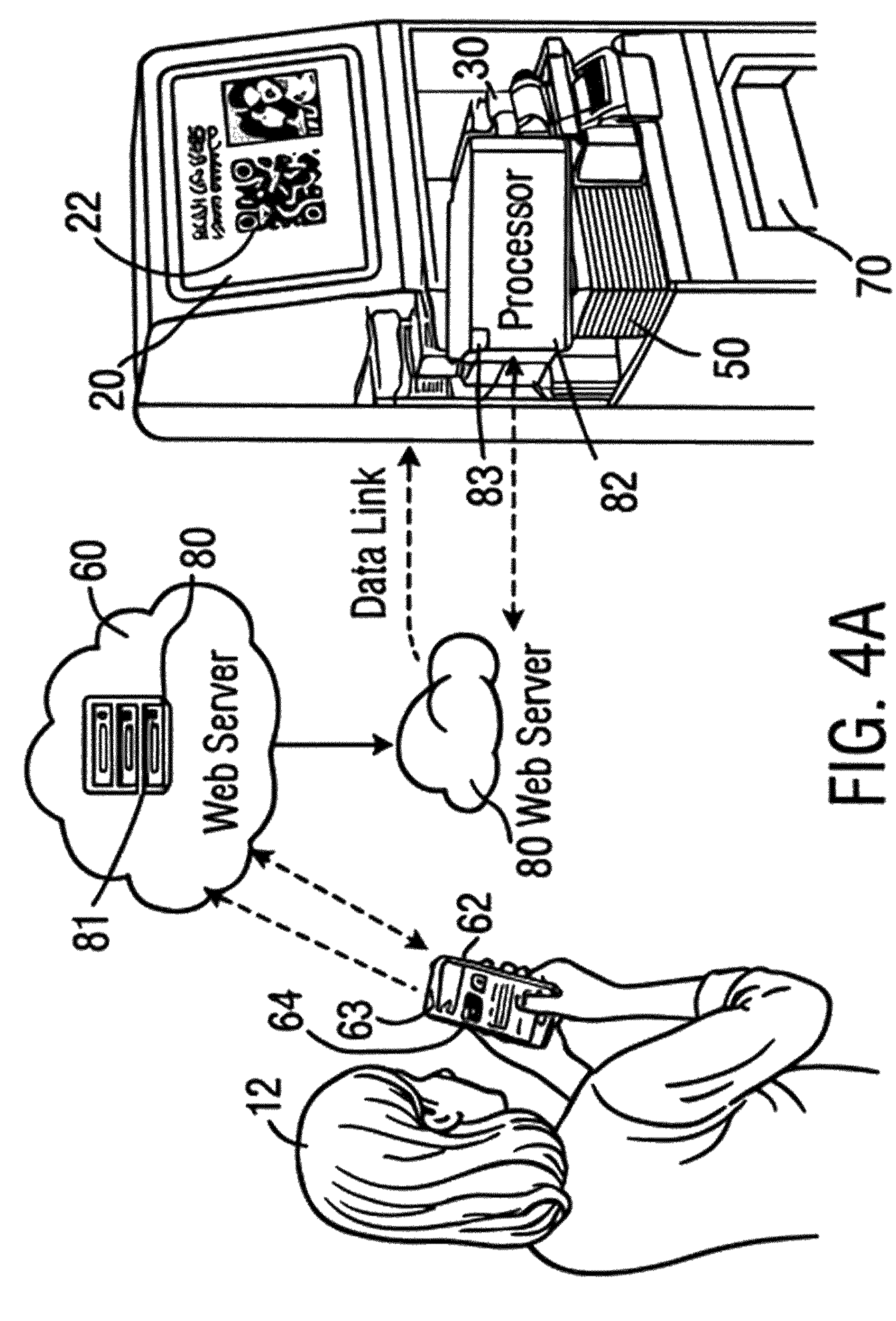
FIG. 4A is a schematic view of a user utilizing an App on her mobile device to communicate with a web server that is in communication with the kiosk and showing the inside of the digital kiosk including a printer, feeder and stack of blank pre-cut magnetic sheets, in accordance with one embodiment.
Figure 4B:
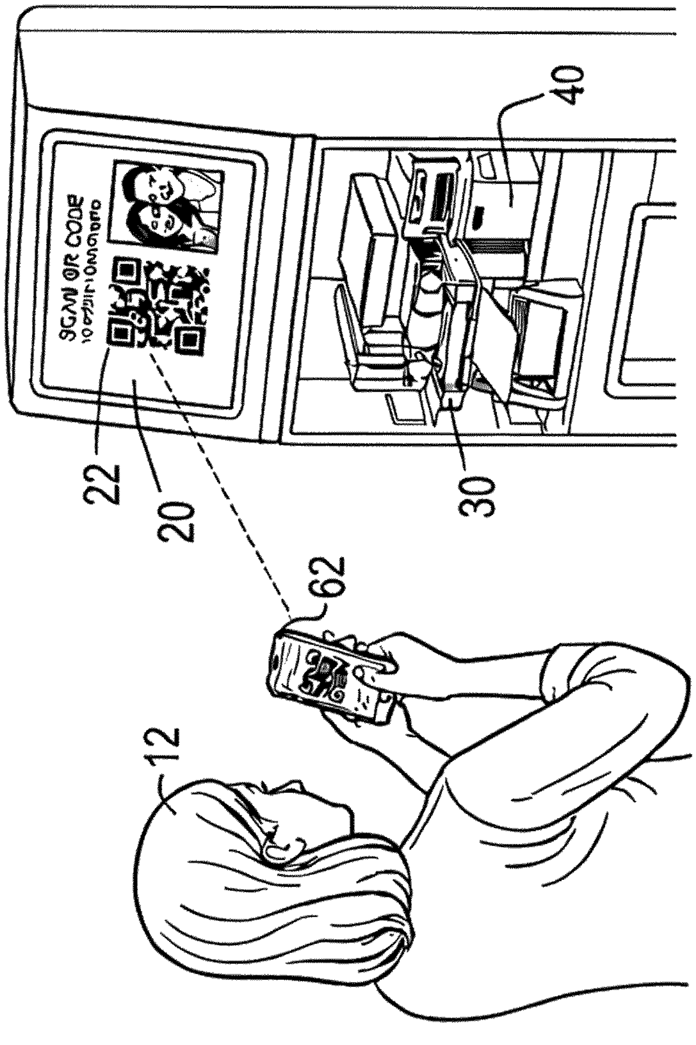
FIG. 4B is schematic view of a user utilizing an App to link a mobile device to a QR code on a screen of the digital kiosk and showing the inside of the kiosk, in accordance with one embodiment.
Figure 9:
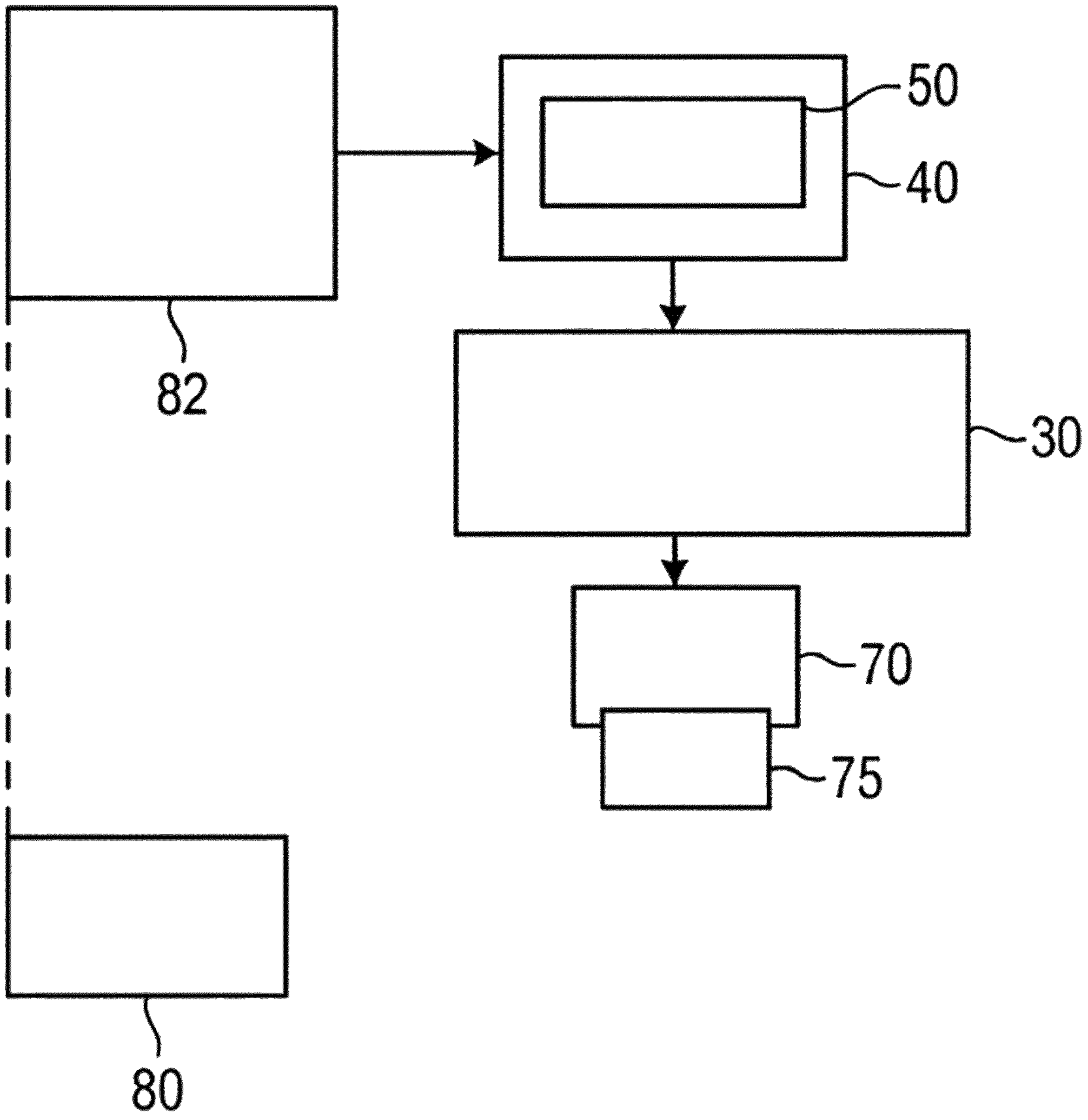
FIG. 9 is a schematic view of components in the work flow of the printing process, in accordance with one embodiment.

As shown in FIG. 4A, FIG. 4B and FIG. 9, digital kiosk 10 may include a printer 30, for example in its interior. Two non-limiting examples of the kinds of printers 30 that the kiosk 10 may have for example inside the walls of the kiosk 10 are: (a) a printer 30 compatible with UV-curable ink such as an ultra-high speed printer and (b) a sublimation printer 30.

As shown in FIG. 4B and in FIG. 9, digital kiosk 10 also may include an automated feeder 40 on or inside the kiosk 10. Automated feeder 40 is configured to repeatedly deliver to the printer 30 individual flexible blank pre-cut magnetic sheets 50 from a stack 52 of the blank pre-cut magnetic sheets 50. For example, the automated feeder 40 may have roller(s) or belt(s) configured to separate individual sheets from the stack and advance the individual sheets into a print zone of the printer 30.

As best seen in FIG. 5, FIG. 6A, FIG. 6B, FIG. 7, FIG. 8A and FIG. 8B, each of the blank pre-cut magnetic sheets 50 in the stack have several layers including at least the following layers: (A) a flexible magnetic layer 53 comprising magnetic particles dispersed in a flexible polymer binder, the magnetic particles comprising ferrite particles, neodymium particles, or combinations thereof, (B) a pressure sensitive adhesive layer 54 and (C) a peelable cover layer 55 configured to be removed to permit adhesion of the sheet (as a photo) to nonmetal substrates. The peelable cover layer 55 is called a "cover" layer because it is at the end of the sheet layers, which means that it is on the bottom of the sheet 50 in a first orientation, or on the top of the sheet 50 in a second orientation (where the entire sheet 50 is turned upside down).

These three layers 53, 54, 55 may be arranged such that the pressure sensitive adhesive layer 54 is disposed between the flexible magnetic layer 53 and the peelable cover layer 55. Consequently, whether the printer 30 is a UV printer or the printer is a sublimation printer 30, the kiosk 10 will dispense to the user a physical photo that has a dual method of attachment without any complicated add-ons. The user has a choice to adhere the physical photo to metal surfaces or to nonmetal surfaces. For metal surfaces the user need not take any additional action. For nonmetal surfaces the user need only peel off the peelable cover layer in the back of the physical photo before attaching via the pressure sensitive adhesive layer to wood surfaces, glass surfaces, plastic surfaces, cement walls or other nonmetal surfaces. The "back" is normally on the bottom but this term does not require necessarily being on the bottom since the sheet in certain circumstances may be upside down. The pressure sensitive adhesive layer 54 is permanently present on the sheet 50 during magnetic attachment and does not interfere with magnetic retention while covered by the peelable cover layer 55.

Each sheet 50 in the stack of blank pre-cut magnetic sheets 50 may have one or two additional layers 51, 52 besides the three referred to. These layers will be in the front of the photo when the physical photo is dispensed to the user as an end product. The term "front" is on the top when the photo is positioned with the image facing up.

Figure 5:
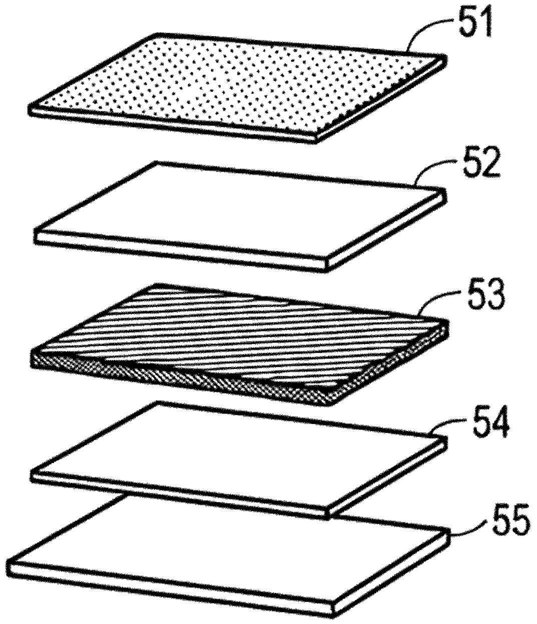
FIG. 5 is an exploded view of the layers of one pre-cut magnet sheet including the UV-curable ink image layer formed on the coating during printing and curing by the UV printer in the digital kiosk, in accordance with one embodiment.
Figure 6A:
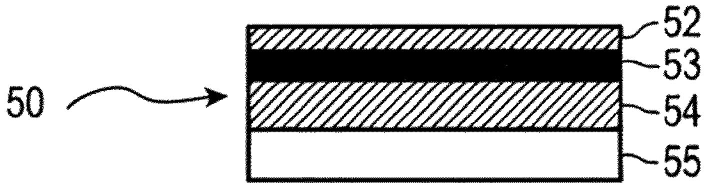
FIG. 6A is a side view of the layers of one blank pre-cut magnet sheet configured to be fed into a UV printer and not including the UV curable ink image layer, in accordance with one embodiment.
Figure 6B:
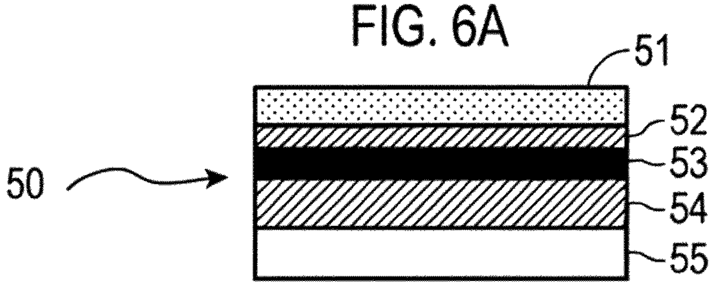
FIG. 6B is a side view showing the layers of the sheet of FIG. 5 after the UV-curable ink image layer has been formed on the coating during printing and curing, in accordance with one embodiment.

As shown in FIG. 5, FIG. 6A and FIG. 6B, if the digital kiosk 10 includes a UV printer 30, then in addition to the three layers (the flexible magnetic layer 53, the pressure sensitive adhesive layer 54 and the peelable cover 55) each sheet 50 will include the following: a UV-receptive coating 52 configured to receive UV-curable ink deposited by the printer. The sheet 50 will include this when it is fed into the printer 30, as shown in FIG. 6A. Printer 30 is configured to deposit UV-curable ink onto the UV-receptive coating of each sheet 50 to form the UV-curable ink image layer during printing and curing. Accordingly, when the sheet 50 exits the printer 30 it will also include the following: a UV-curable ink image layer 51 formed on the coating during printing and curing, as shown in FIG. 6B.

Upon exiting printer 30, the flexible, as shown in FIG. 6B, pre-cut sheet 50 comprises the following layers: (i) a UV-receptive coating configured to receive UV-curable ink deposited by the printer; (ii) a UV-curable ink image layer formed on the coating during printing and curing; (iii) a flexible magnetic layer comprising magnetic particles dispersed in a flexible polymer binder, the magnetic particles comprising ferrite particles, neodymium particles, or combinations thereof; (iv) a pressure sensitive adhesive layer; and (v) a peelable cover layer configured to be removed to permit adhesion of the sheet to nonmetal substrates.

The flexible magnetic layer 53 may be disposed between the coating 52 and the pressure sensitive adhesive layer 54.

The word "on" in the phrase "formed on the coating" that has been used in describing the relationship between the UV-receptive coating layer and the UV-curable ink image layer within the pre-cut magnetic sheets, is intended to be orientation neutral. Thus, the word "on" encompasses both a first orientation, in which the UV-curable ink image layer is at the top surface of the whole sheet 50, and a second orientation in which the UV-curable ink image layer is at the bottom surface of the whole sheet 50, (when the entire sheet 50 (or stack of sheets) is turned upside down relative to the first orientation).

As shown in FIG. 5, FIG. 6A and FIG. 6B, regarding the embodiment that utilizes the UV printer 30 in the kiosk 10, in some implementations, the UV-receptive coating 52 comprises an acrylic-based material, a urethane-based material, or a combination thereof.

In some versions, in the flexible magnetic layer 53, the flexible polymer binder is flexible PVC or rubber.

In some embodiments, the UV-receptive coating 52 has a thickness of from about 1 micron to about 25 microns. In some versions, the UV-receptive coating layer 52 may have a thickness of about 5 microns to about 6 microns.

Figure 7:
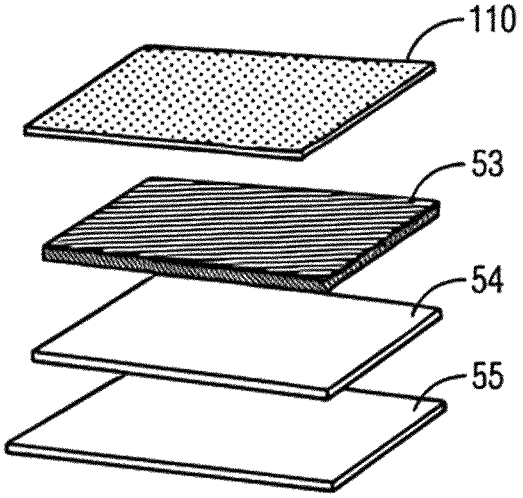
FIG. 7 is an exploded view of the layers of one blank pre-cut magnetic sheet used by a sublimation printer in a digital kiosk, in accordance with one embodiment.
Figure 8A:
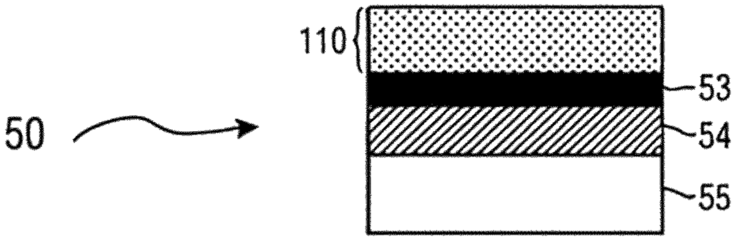
FIG. 8A is a side view showing the layers of the blank pre-cut magnetic sheet of FIG. 7 before the sublimation dye has been embedded into the polymer coating, in accordance with one embodiment.
Figure 8B:
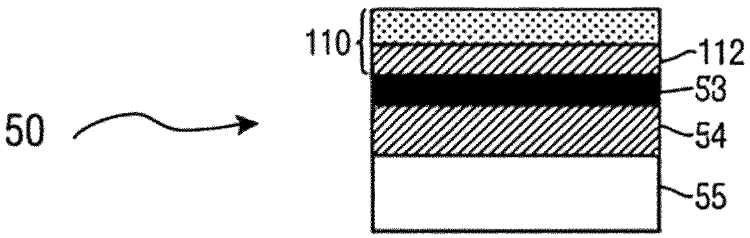
FIG. 8B is a side view showing the layers of the sheet of FIG. 7 after the sublimation dye has been embedded into the polymer coating during the heat transfer process, in accordance with one embodiment.

As shown in FIG. 7. FIG. 8A and FIG. 8B, if the digital kiosk 10 includes a sublimation printer 30, then in addition to the three layers (the flexible magnetic layer 53, the pressure sensitive adhesive layer 54 and the peelable cover 55), each sheet 50 will also include a sublimation-compatible polymer coating 110 configured to receive and embed sublimation dye 112 within polymer coating 110 during a heat transfer process. FIG. 8A shows the sheet 50 prior to the sheet 50 being fed into the sublimation printer 30. FIG. 8B shows the sheet 50 after the sublimation dye 112 has been embedded within polymer coating 110 by the printer 30 during the heat transfer process.

Regarding the embodiment of kiosk 10 utilizing a sublimation printer 30, in some embodiments, the polymer coating is made from polymer resin and has a thickness of about 1 to about 25 microns. In some embodiments, the polymer coating 110 has a thickness of about 5 to about 6 microns. In the flexible magnetic layer 53, the flexible polymer binder may be flexible PVC or rubber.

Figure 4C:
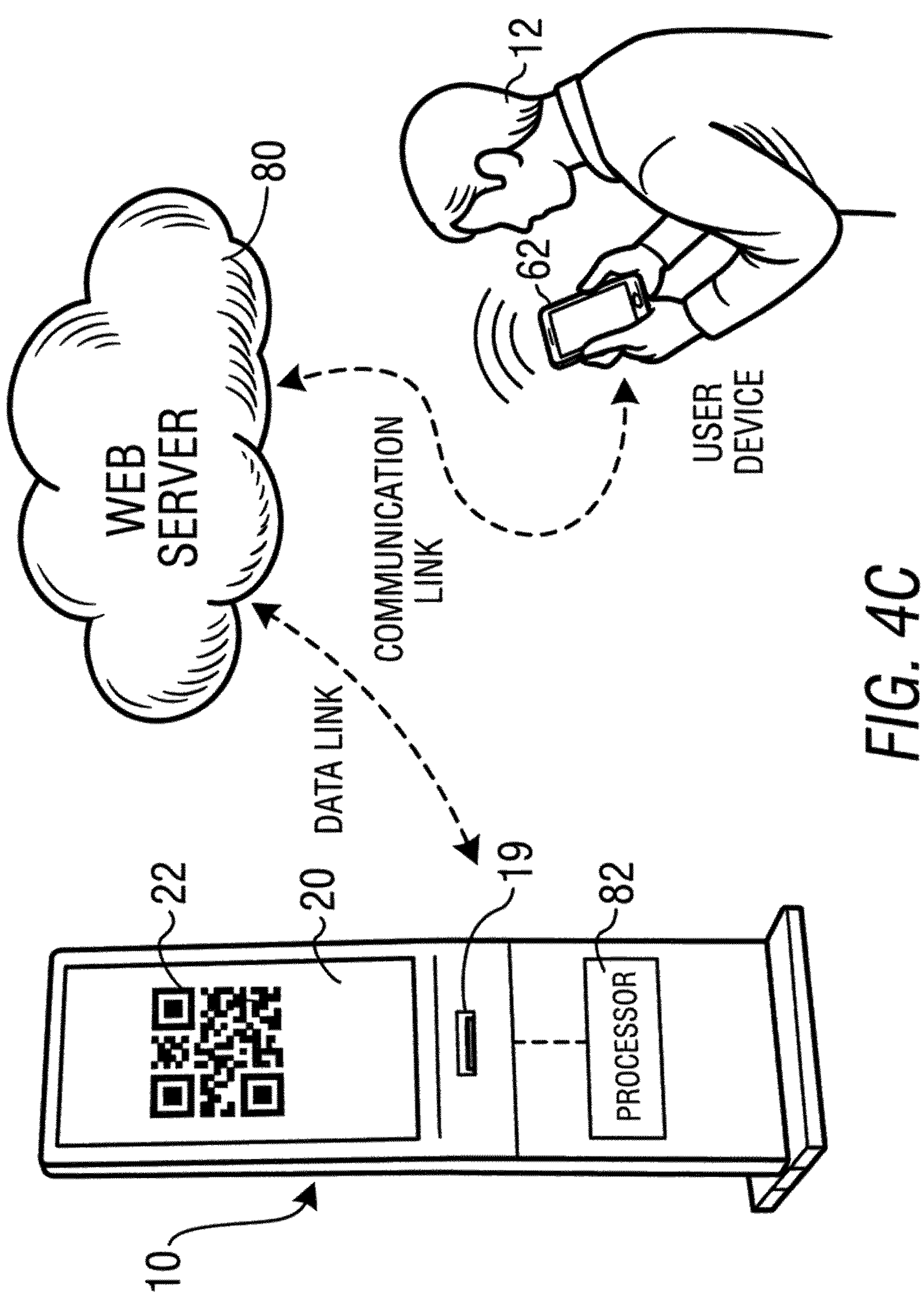
FIG. 4C is a schematic view of a user holding a user device in communication with a web server that is in communication with a local processor of a digital kiosk, in accordance with one embodiment.

As shown in the schematic view of FIG. 9, digital kiosk 10 may also include a dispenser 70 for dispensing the physical photo 75 to the user 12, for example through a slot 19 (FIG. 4C).

In use, a tourist or other customer takes a photo at for example a tourist area and sees the kiosk 10. The user 12 has an application that the user previously downloaded from a web site 60 (FIG. 4A, FIG. 4C) onto their mobile device 62. The application stored on the user's mobile device 62 is configured to prompt the user to select (i) the digital photo from a photo gallery of the user's mobile device 62 and may prompt the user to select (ii) a size and frame of a physical photo derived from the digital photo.

As shown in FIG. 4B, when the user positions his mobile device 62 to face the QR code 22 or other machine readable code 22 on the kiosk screen 20 (or in the case of other communication protocols even without facing his phone to the screen 20 or to the machine-readable code 22), this automatically links the mobile device 62 to the web site 60 (or to a different web site) which automatically appears on the screen of the mobile device 62 using the App. In some versions, as shown in FIG. 4A, using one or more cloud-based processors 80, the first screenshot 63 shown by the App on the mobile device 62 includes a button or tab 64 with the following prompt or something equivalent to the following prompt: "UPLOAD PHOTOS", which prompts the user to upload the photo from the user's photo gallery. In some versions, the user is prompted (as controlled by the one or more processors 80) to select the type of frame they want for the photo (or no frame). In some versions, the user is prompted to select the size of the photo and to provide the user's name.

In some embodiments, as shown in FIG. 4C, user interaction with the kiosk 10 is made via a remote user device (e.g., mobile phone) rather than at the kiosk touchscreen 20.

In some embodiments, as shown in FIG. 4A and FIG. 4C, a cloud-based processor such as a web server (processor) 80 at the web site 60 or at another web site may be configured to provide cloud-based image processing using instructions or software stored on memory 81. One or more cloud-based processors 80 may be configured using programmable instructions stored on memory 81 to handle the management of the photo orders by the many users of the digital kiosk 10. For example, in some embodiments, the one or more processors 80 are configured to execute instructions (stored on memory 81) that determine a pickup time at the kiosk for a physical photo printing job and associate the pickup time with a user identifier or an order identifier. The one or more processors 80 may be configured to execute instructions stored on memory 81 to match an order identification with a user based on the QR code, bar code, NFC or other machine-readable code.

In addition, in some implementations, the one or more cloud-based processors 80 may be configured to execute instructions stored on memory 81 to control a quality of the physical photo 75 by controlling a camera (not shown) configured to check print quality and in some cases to automatically enhance the photo if necessary. Image enhancement, for example, comprises adjusting print density, color balance, or sharpness parameters of the printer 30 based on image data captured by the camera.

The one or more processors 80 may be configured to execute instructions stored on memory 81 to perform one or both of (i) match an order identification based on the machine-readable code and (ii) sort physical photos 75 into individual bins for customer pick-up.

In any of the embodiments described herein, as shown in FIG. 4A, kiosk 10 may include a local processor 82 in communication with the one or more processors 80, the local processor 82 located within the kiosk 10. Local processor 82 may be configured to execute programmable instructions or software stored on a memory 83 so as to control the automatic feeder 40 and the printer 30 including all the operations of the printer 30, for example timing of printing, actuation of the feeder, and routing of printed sheets to the dispenser. The cloud-based processors 80 and/or the local processor 82 may control the digital screen 20. For example, the cloud-based processor(s) 80 may control the content and workflow logic, while the local processor 82 may handle the physical display control and coordination with the kiosk hardware.

In some embodiments, the stack of pre-cut sheets 50 may be stored in a removable cassette or cartridge.

Figure 3:
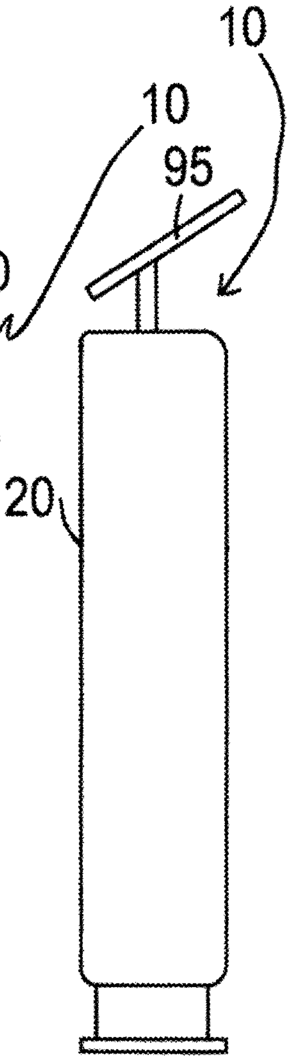
FIG. 3 is a side view of the digital kiosk of FIG. 1, in accordance with one embodiment.
Figure 2:
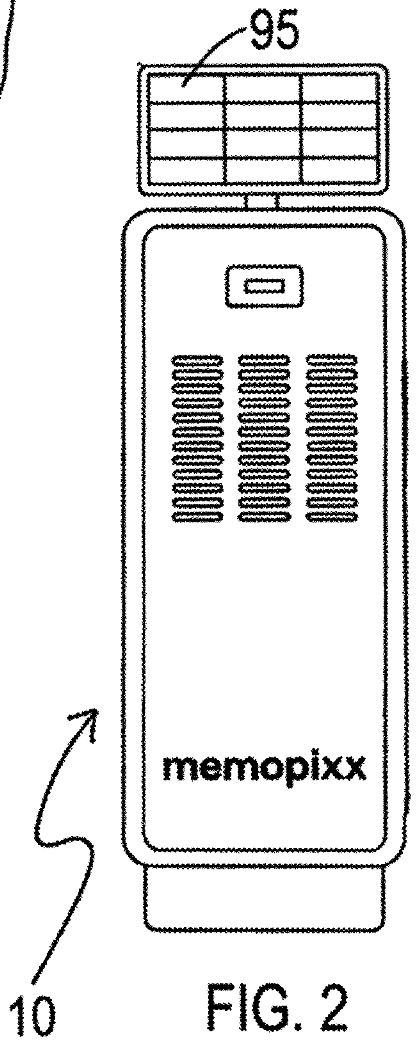
FIG. 2 is a rear view of the digital kiosk of FIG. 1, in accordance with one embodiment.

In some embodiments, as shown in FIG. 1, FIG. 2 and FIG. 3, kiosk 10 is operated by power supplied from a solar panel 95 that may be situated on the roof of the kiosk 10. Alternatively, the solar panel 95 provides an alternative or supplementary source of power.

Although this is not a limitation, in some non-limiting implementations, the height of the kiosk 10 is 1.0 meter to 2.0 meters so that the screen 20 is easily seen by users. The thickness (from front to rear) of the kiosk should be large enough to house the printer 30, automatic feeder 40, stack of sheets 50 and dispenser 70. In some cases, inside the kiosk walls there may also be separate bins for sorting physical photos 75 to be dispensed to different users.

The term "about" as used herein means plus or minus 5%.

While the invention has been described with respect to a limited number of embodiments, it will be appreciated that many variations, modifications and other applications of the invention may be made. Therefore, the claimed invention, as recited in the claims that follow, is not limited to the embodiments described herein.

What is claimed is:

1. A digital kiosk, comprising
a printer compatible with UV-curable ink,
an automated feeder on or inside the kiosk and configured to repeatedly deliver to the printer individual flexible blank pre-cut magnetic sheets from a stack of the blank pre-cut magnetic sheets,
each of the blank pre-cut magnetic sheets in the stack comprising the following layers:
a UV-receptive coating configured to receive LV-curable ink deposited by the printer;
a flexible magnetic layer comprising magnetic particles dispersed in a flexible polymer binder, the magnetic particles comprising ferrite particles, neodymium particles, or combinations thereof;
a pressure sensitive adhesive layer; and
a peelable cover layer configured to be removed to permit adhesion of the physical photo to nonmetal substrates,
wherein the printer is configured to deposit UV-curable ink onto the UV-receptive coating of each sheet to form a UV-curable ink image layer during printing and curing, thereby forming a physical photo,
a dispenser for dispensing the physical photo to the user, and
a digital screen configured to display a machine-readable code that, when scanned by a user device, encodes information associated with a particular user and links to a web site configured to receive a digital photo uploaded by the particular user, and
one or more processors configured to execute instructions that determine a pickup time at the kiosk for a physical photo printing job and associate the pickup time with a user identifier or an order identifier.

2. The digital kiosk of claim 1, further comprising an application stored on the user's mobile device, the application configured to prompt the user to select (i) the digital photo from a photo gallery of the user's mobile device and (ii) a size and frame of a physical photo derived from the digital photo.

3. The digital kiosk of claim 1, wherein the one or more processors are configured to execute instructions to control a quality of the physical photo by controlling a camera configured to check print quality and automatically enhance the photo if necessary.

4. The digital kiosk of claim 1, wherein the one or more processors are configured to execute instructions to perform one or both of (i) match an order identification with a user based on the machine-readable code and (ii) sort physical photos into individual bins for customer pick-up.

5. The digital kiosk of claim 1, wherein the UV-receptive coating comprises an acrylic-based material, a urethane-based material, or a combination thereof, and has a thickness of from about 1 micron to about 25 microns.

6. The digital kiosk of claim 1, wherein the UV-receptive coating is from about 5 microns to about 6 microns thick.

7. The digital kiosk of claim 1, wherein the flexible polymer binder is flexible PVC or rubber.

8. The digital kiosk of claim 1, wherein the magnetic layer is disposed between the coating and the pressure sensitive adhesive layer.

9. A flexible, pre-cut sheet comprising the following layers:
(i) a UV-receptive coating configured to receive UV-curable ink deposited by the printer, wherein the coating is about 5 to about 6 microns thick;
(ii) a UV-curable ink image layer formed on the coating during printing and curing;
(iii) a flexible magnetic layer comprising magnetic particles dispersed in a flexible polymer binder, the magnetic particles comprising ferrite particles, neodymium particles, or combinations thereof;
(iv) a pressure sensitive adhesive layer; and
(v) a peelable cover layer configured to be removed to permit adhesion of the sheet to nonmetal substrates.

10. The sheet of claim 9, wherein in each sheet the magnetic layer is disposed between the coating and the pressure sensitive adhesive layer.

11. The sheet of claim 9, wherein the coating comprises an acrylic-based material or a urethane-based material.

12. The sheet of claim 9, wherein the coating is about 1 to about 25 microns thick.

13. The sheet of claim 9, wherein the coating is a scratch resistant coating layer configured to resist abrasion during automated feeding, printing, and user handling.

14. The sheet of claim 9, wherein the flexible polymer binder of the flexible magnetic layer comprises flexible PVC or rubber.

15. A digital kiosk, comprising
a printer compatible with UV-curable ink,
an automated feeder on or inside the kiosk and configured to repeatedly deliver to the printer individual flexible blank pre-cut magnetic sheets from a stack of the blank pre-cute magnetic sheets,
each of the blank pre-cut magnetic sheets in the stack comprising the following layers;
a UV-receptive coating configured to receive UV-curable ink deposited by the printer;
a flexible magnetic layer comprising magnetic articles dispersed in a flexible polymer binder, the magnetic particles comprising ferrite particles, neodymium particles, or combinations thereof;
a pressure sensitive adhesive layer; and
a peelable cover layer configured to be removed to permit adhesion of the physical photo to nonmetal substrates,
wherein the printer is configured to deposit UV-curable ink onto the UV-receptive coating of each sheet to form a UV-curable ink image layer during printing and curing, thereby forming a physical photo,
a dispenser for dispensing the physical photo to the user, and a digital screen configured to display a machine-readable code that, when scanned by a user device, encodes information associated with a particular user and links to a web site configured to receive a digital photo uploaded by the particular user, wherein the UV-receptive coating is from about 5 microns to about 6 microns thick.

16. The digital kiosk of claim 15, further comprising an application stored on the user's mobile device, the application configured to prompt the user to select (i) the digital photo from a photo gallery of the user's mobile device and (ii) a size and frame of a physical photo derived from the digital photo.

17. The digital kiosk of claim 15, further comprising one or more processors configured to execute instructions that determine a pickup time at the kiosk for a physical photo printing job and associate the pickup time with a user identifier or an order identifier.

18. The digital kiosk of claim 15, further comprising one or more processors configured to execute instructions to control a quality of the physical photo by controlling a camera configured to check print quality and automatically enhance the photo if necessary.

19. The digital kiosk of claim 15, further comprising one or more processors configured to execute instructions to perform one or both of (i) match an order identification with a user based on the machine-readable code and (ii) sort physical photos into individual bins for customer pick-up.

20. The digital kiosk of claim 15, wherein the UV-receptive coating comprises an acrylic-based material a urethane-based material, or a combination thereof.

21. The digital kiosk of claim 15, wherein the flexible polymer binder is flexible PVC or rubber.

22. The digital kiosk of claim 15, wherein the magnetic layer is disposed between the coating and the pressure sensitive adhesive layer.

* * * * *